US009367230B2

(12) United States Patent
Williams et al.

(10) Patent No.: US 9,367,230 B2
(45) Date of Patent: Jun. 14, 2016

(54) INTERACTION MODELS FOR INDIRECT INTERACTION DEVICES

(75) Inventors: Sarah G. Williams, Seattle, WA (US); Scott Honji, Sammamish, WA (US); Masahiko Kaneko, Fall City, WA (US); Jan-Kristian Markiewicz, Redmond, WA (US); Vincent Ball, Kirkland, WA (US); Amish Patel, Seattle, WA (US); Paul R. Millsap, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1161 days.

(21) Appl. No.: 13/291,639

(22) Filed: Nov. 8, 2011

(65) Prior Publication Data

US 2013/0113716 A1   May 9, 2013

(51) Int. Cl.
G06F 3/041 (2006.01)
G06F 3/0488 (2013.01)
G06F 3/038 (2013.01)

(52) U.S. Cl.
CPC .............. *G06F 3/0488* (2013.01); *G06F 3/038* (2013.01)

(58) Field of Classification Search
CPC .................................................... G06F 3/0488
USPC ........................................................ 345/173
See application file for complete search history.

(56) References Cited

U.S. PATENT DOCUMENTS

| 7,855,718 B2 | 12/2010 | Westerman | |
| 2005/0179655 A1* | 8/2005 | Ludwig | 345/157 |
| 2006/0143571 A1 | 6/2006 | Chan | |
| 2006/0227116 A1 | 10/2006 | Zotov et al. | |
| 2008/0024454 A1 | 1/2008 | Everest | |

(Continued)

FOREIGN PATENT DOCUMENTS

| CN | 201408414 Y | 2/2010 |
| CN | 102221964 A | 10/2011 |
| EP | 2192479 A1 | 6/2010 |
| WO | 2011049513 A1 | 4/2011 |

OTHER PUBLICATIONS

Fragiacomo, et al., "Novel Designs for Application Specific MEMS Pressure Sensors", Published Date: Oct. 28, 2010, Retrieved at <<http://www.mdpi.com/1424-8220/10/11/9541/pdf>>, Sensors, vol. 10, No. 11, 2010, pp. 9541-9563.

(Continued)

*Primary Examiner* — Gustavo Polo
(74) *Attorney, Agent, or Firm* — Qudus Olaniran; Judy Yee; Micky Minhas

(57) ABSTRACT

One or more techniques and/or systems are provided for utilizing input data received from an indirect interaction device (e.g., mouse, touchpad, etc.) as if the data was received from a direct interaction device (e.g., touchscreen). Interaction models are described for handling input data received from an indirect interaction device. For example, the interaction models may provide for the presentation of two or more targets (e.g., cursors) on a display when two or more contacts (e.g., fingers) are detected by indirect interaction device. Moreover, based upon a number of contacts detected and/or a pressured applied by respective contacts, the presented target(s) may be respectively transitioned between a hover visualization and an engage visualization. Targets in an engage visualization may manipulate a size of an object presented in a user interface, pan the object, drag the object, rotate the object, and/or otherwise engage the object, for example.

20 Claims, 6 Drawing Sheets

(56) References Cited

U.S. PATENT DOCUMENTS

| | | |
|---|---|---|
| 2008/0229197 A1 | 9/2008 | Branson et al. |
| 2009/0144312 A1 | 6/2009 | Patel |
| 2010/0060605 A1 | 3/2010 | Rimas-Ribikauskas et al. |
| 2010/0103117 A1 | 4/2010 | Townsend et al. |
| 2010/0127975 A1 | 5/2010 | Jensen |
| 2010/0139990 A1 | 6/2010 | Westerman et al. |
| 2010/0283747 A1 | 11/2010 | Kukulski |
| 2010/0328227 A1 | 12/2010 | Matejka et al. |
| 2011/0012845 A1 | 1/2011 | Rothkopf et al. |
| 2011/0050394 A1 | 3/2011 | Zhang et al. |
| 2011/0063248 A1 | 3/2011 | Yoon |
| 2011/0080341 A1 | 4/2011 | Helmes et al. |
| 2011/0102570 A1 | 5/2011 | Wilf et al. |

OTHER PUBLICATIONS

Matejka; et al., "The Design and Evaluation of Multi-Finger Mouse Emulation Techniques", Published Date: Apr. 7, 2009, Proceedings: Proceedings of the 27th international conference on Human factors in computing systems, ACM, http://www.autodeskresearch.com/pdf/p1073-matejka.pdf.

Moscovish; et al., "Indirect Mappings of Multi-touch Input Using One and Two Hands", Published Date: Apr. 5-10, 2008, Proceedings: CHI 2008, ACM, http://www.moscovich.net/tomer/papers/moscovich_multi_chi08.pdf.

Moscovich; et al., "Multi-finger Cursor Techniques", Graphics Interface 2006, http://www.autodeskresearch.com/pdf/p1073-matejka.pdf.

"International Search Report", Mailed Date: Mar. 29, 2013, Application No. PCT/US2012/063627, Filed Date: Nov. 5, 2012, pp. 10.

Benko, et al., "Design and Evaluation of Interaction Models for Multi-touch Mice", Proc. of Graphics Interface Conference 2010, Ottawa, Ontario, Canada, May 31, 2010, pp. 8.

"Supplementary Search Report Issued in European Patent Application No. 12848100.9", Mailed Date: Jun. 30, 2015, 6 Pages.

First Office Action and Search Report Issued in Chinese Patent Application No. 201280054888.6, Mailed Date: Mar. 29, 2016, 14 Pages.

* cited by examiner

INTERACTION MODELS FOR INDIRECT INTERACTION DEVICES

BACKGROUND

Conventionally, users interact with elements of a user interface using a variety of input devices. Generally, these input devices can be classified as direct interaction devices and/or indirect interaction devices based upon the type of interaction the device has with the user interface. For example, a direct interaction device, such as a touchscreen, is configured to enable a user to interact directly with what is displayed on a monitor, whereas an indirect interaction device, such as a mouse or keyboard, for example, is configured to enable a user to indirectly interact with what is displayed on a monitor.

A mouse and devices that emulate a mouse, such as a touchpad, for example, are some of the more popular types of indirect interaction devices. The user interacts with the device, and the interaction is mapped to a position on the display. For example, a mouse may sense movement, which is mapped to a position based upon a presumed starting position and the sensed interaction with the device. A touchpad is commonly used in a manner similar to a mouse. The motion of a contact (e.g., finger, stylus, etc.) on the touchpad is sensed, and the sensed motion is treated in a manner similar to a mouse input. Conventionally, mice and devices that emulate mice, such as touchpads, have been configured to control merely one target on the user interface (e.g., one mouse pointer, cursor, etc.). Thus, they may be referred to as single-point devices.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for interacting with objects of a user interface via an indirect interaction device are provided. More particularly, the systems and/or techniques describe various interaction models that are configured to substantially emulate a response that may occur if a user were to interact via a direct interaction device (e.g., via a touchscreen) when the user (instead) interacts with the indirect interaction device.

The interaction models are configured to provide for the visualization of one or more contacts (e.g., fingers) that interact with the indirect interaction device. For example, when two contacts interact with the indirect interaction device substantially concurrently, two targets (e.g., representations of the contacts on a display, such as mouse pointers, cursors, etc.) may be presented on a display of the computer system substantially concurrently. In this way, interaction with an indirect interaction device is visualized in a manner similar to the visualization of a direct interaction device (e.g., where a user could interact directly with the display such as where his/her fingers overlay objects on the display).

Numerous interaction models are devised herein for substantially emulating a response that may occur if a user were to interact via a direct interaction device when the user actually interacts with the indirect interaction device. The particular interaction model that is used by a computer system may depend upon, among other things, user preferences, a size of the display in relation to a size of the indirect interaction device, developer preferences, etc. For example, in one embodiment, a user and/or operating system may dynamically change the interaction model that is utilized depending upon, among other things, a user interface that is presented on the display.

The interaction models may generally fall into two categories, basic and advanced. The basic interaction models are generally designed to utilize at least two contacts (e.g., fingers, stylus, etc.) that can interact with (e.g., touch, hover over, etc.) the indirect interaction device. For example, the detection of a first contact by the indirect interaction device may be configured to cause a computer system (e.g., or a portion thereof) to enter a hover mode, where a target (e.g., a representation of the first contact that is presented on a display, such as a mouse pointer on a monitor) may be maneuvered on the display (e.g., via movement by the first contact on the indirect interaction device) until the target hovers overs over a desired object of the user interface (e.g., a particular file, menu, etc.). The detection of a second contact by the indirect interaction device may be configured to cause the computer system (e.g., or a portion thereof) to enter into an engage mode configured to engage an object on the display that the target is hovering over.

The advanced interaction models are generally designed to utilize merely one contact for determining when to enter hover mode and/or engage mode. For example, in one embodiment, the indirect interaction device comprises one or more pressure sensors configured to determine an amount of pressure the contact is applying to the indirect interaction device. When the amount of pressure is within a specified range, the computer system (e.g., or a portion thereof) may be configured to enter a hover mode (e.g., to allow a mouse pointer to be moved around on a display). When the amount of pressure exceeds the specified range, the computer system (e.g., or a portion thereof) may be configured to enter an engage mode, for example (e.g., to allow a hovered-over button to be "clicked").

In one embodiment of an advanced interaction model, a plurality of contacts may interact with the indirect interaction device. In such an embodiment, respective contacts may be configured to cause the computer system (e.g., or a portion thereof) to enter a hover and/or engage mode. For example, a first contact associated with a first target on the display may be utilized to engage a first object (e.g., proximate the first target on the display), and a second contact associated with a second target on the display may be utilized to engage a second object (e.g., proximate the second target on the display). Thus, in advanced mode, contacts may control whether respective targets merely hover over an object or engage the object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
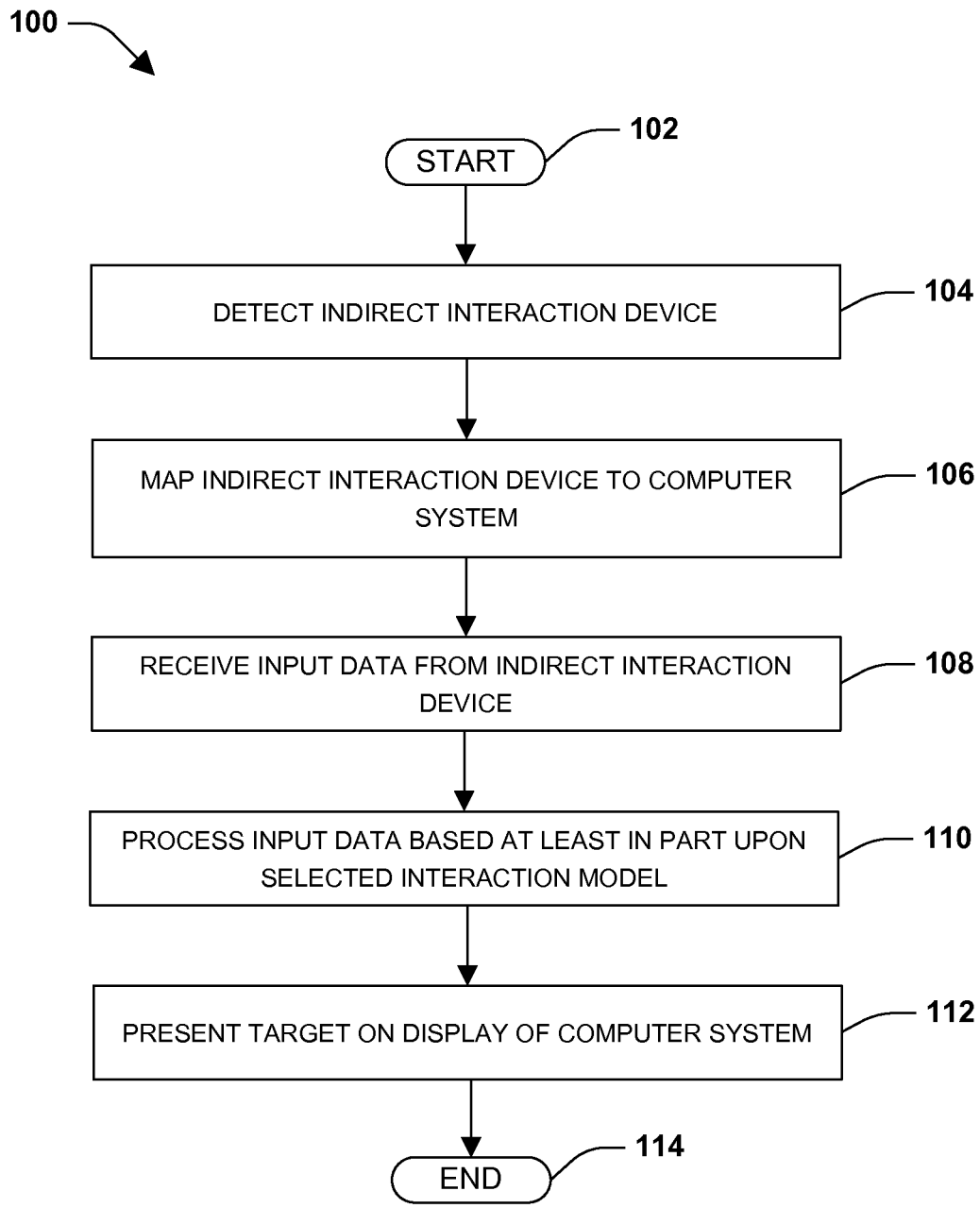
FIG. 1 is an exemplary method for controlling one or more targets presented on a display based upon input data received from an indirect interaction device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

It may be appreciated that in some applications direct interaction devices (e.g., utilizing touch screen technology) may be more advantageous than indirect interaction devices (e.g., utilizing cursor and key interfaces). For example, direct interaction devices may be well suited for point-of-sale devices, kiosk applications, GPS navigation devices, and/or industrial and home automation systems, for example, (e.g., because transactions are relatively brief, data input/user interaction is limited, etc.). In other applications, however, indirect interaction devices may be more advantageous. For example, graphic design, audio and video editing, spreadsheet manipulation, and word processing applications, etc. may be well served by indirect interaction devices (e.g., where substantial user interaction is sustained for extended periods of time). Moreover, direct touch devices may be somewhat imprecise as hands and fingers may occlude relatively small elements of a user interface, and may leave residue, smudges, etc. on a presentation surface of a display.

Among other things, one or more systems and/or techniques are provided for utilizing an indirect interaction device (e.g., a touchpad or other input apparatus) in one or more manners that provide for at least some of the benefits of direct touch devices while also mitigating at least some of the deficiencies of direct touch devices. For example, interaction with an indirect interaction device is visualized in a manner similar to the visualization of a direct interaction device (e.g., where a user could interact directly with a display via a direct touch system such as where his/her fingers overlay objects on the display). It will be appreciated that "indirect interaction" and/or the like are used in a broad sense herein to describe a form of interaction where an entity (e.g., user) interacts with a device other than a display to cause a user interface on the display to change. For example, a touchpad of a laptop computer may be an example of an indirect interaction device because a user may interact with the touchpad to control a pointer that is presented on the display/monitor of the laptop.

It will be appreciated that in some applications, a direct interaction device may be utilized as an indirect interaction device. As an example, where a mobile device comprising a touchscreen is utilized as a remote control for controlling a television, the touchscreen of the mobile device may be utilized as an indirect interaction device to manipulate a user interface (e.g., a target, cursor, etc. thereon) that is being displayed on the television, for example.

FIG. 1 illustrates an example method 100 for presenting a target (e.g., a pointer) on a display based upon information received from an indirect interaction device (e.g., a touchpad or other touch sensitive surface, a heat sensitive surface, etc.) that may be utilized by an entity (e.g., user) to manipulate objects of a user interface that are presented on the display. Such a method 100 may find particular applicability to laptop and/or desktop computers that generally do not comprise a touchscreen, but it is not intended to be limited as such. For example, in another embodiment, the example method 100 may be used in conjunction with a touchscreen, where an indirect interaction device may supplement the touchscreen (e.g., such an in applications where precision that is not normally achievable via touchscreen is desired).

The example method 100 begins at 102, and an indirect interaction device that has been coupled to a computer system is detected at 104. By way of example, a touchpad may be coupled to the computer system via a wired connection (e.g., universal serial bus (USB), etc.) and/or a wireless connection (e.g., Bluetooth connection, infrared connection, etc.). Moreover, it will be appreciated that the indirect interaction device may be coupled to the computer system at the time the computer system is manufactured, and thus the indirect interaction device may be detected upon the initial boot-up of the computer system, for example. Alternatively, the indirect interaction device may be coupled to the computer system by the end-user, for example, and may be detected upon the indirect interaction device being coupled and/or upon a subsequent reboot, for example.

Upon detection of the indirect interaction device, the computer system and/or a component thereof may be configured to install drivers that are configured to provide for the transference of data between the indirect interaction device and the computer system and/or otherwise prepare the computer system for interaction with the indirect interaction device and/or vice-versa, for example.

The example method 100 also comprises mapping the indirect interaction device to the computer system at 106 based at least in part upon a selected interaction method. That is, stated differently touch sensors, heat sensors, or other types of sensors comprised on a sensory surface of the indirect interaction device are mapped to the display based upon a mapping technique specified by the selected interaction method (e.g., which may be selected by an operating system manufacturer, computer manufacturer, user, etc.). As an example, the interaction method may provide for mapping the indirect interaction device to the computer system using an absolute, relative, and/or heterogeneous (e.g., a combination of absolute and relative) mapping technique(s).

Absolute mapping techniques are generally configured to scale an axis of the indirect interaction device to a corresponding axis of the display. For example, an x-axis of the indirect interaction device may be scaled with a corresponding x-axis of the display such that, in the x-direction, respective points on a sensory surface of the indirect interaction device map to merely one point (e.g., or a specific number of points) on the display. Similarly, a y-axis of the indirect interaction device may be scaled with a corresponding y-axis of the display such that, in the y-direction, respective points on the sensory surface of the indirect interaction device map to merely one point (e.g., or a specific number of points) on the display. In this way, points on the sensory surface generally correspond to respective points on the display. That is, for example, the edges of the sensory surface of the indirect interaction device correspond to the respective edges of the display, such that the sensory surface is a (miniature) representation of the display. For example, if a contact (e.g., finger) touches the top right corner of the sensory surface of an indirect interaction device, a pointer representing the contact on the display may be positioned in the top right corner because the top right corner of the sensory surface is mapped to the top right corner of the display. Conventionally, touchscreens and/or pen digitizers have utilized absolute mapping techniques.

Relative mapping techniques are different than absolute mapping techniques in that the sensory surface is generally mapped to a moveable subregion of a display (e.g., which is not shown to a user). That is, the mapping is a function of a present location of a target (e.g., pointer) on the display at the time a contact (e.g., finger) is detected by the sensory surface and may change based upon a change in a location of the target. For example, where the target is centered in an upper right quadrant of the display when a contact is detected, the sensory surface may be mapped such that a center point of the sensory surface corresponds to a location of the target (e.g., causing less than all of the display to be mapped to a point on the sensory surface) (e.g., merely the upper right quadrant may be mapped, for example). If no contact is detected by the sensory surface for a period of time, when a contact is again detected, the mapping may be altered such that the position of the target is mapped to a center point of the sensory surface, for example. Thus, where the sensory surface is mapped using a relative mapping technique, the mapping may change from time-to-time (e.g., as opposed to absolute mapping, where the mapping typically does not change unless there is a change to the display and/or to the sensory surface of the indirect interaction device). Conventionally, mice and/or mice-emulating trackpads have utilized relative mapping techniques.

Heterogeneous mapping techniques combine the notion of absolute mapping and relative mapping. For example, respective axes of a sensory surface of the indirect interaction device may be mapped independently, with a first axis being mapped using an absolute mapping technique and a second axis being mapped using a relative mapping technique. For example, a relative mapping technique may be applied to the y-axis of the sensory surface and an absolute mapping technique may be applied to the x-axis of the sensory surface or vice-versa.

While absolute, relative, and heterogeneous mapping techniques are described herein, it will be appreciated that other mapping techniques are also contemplated and are not to be excluded from the scope of the appended claims, for example.

At 108 in the example method 100, input data is received from the indirect interaction device or from the sensory surface of the indirect interaction device. For example, a user may place one or more fingers on the sensory surface, causing input data to be generated. Generally speaking, the input data is indicative of a location(s) on the sensory surface that is being contacted by a contact(s). The input data may also be indicative of other information that may be acquired from the sensory surface.

By way of example, the input data may describe a location and/or locations of one or more fingers in contact with the sensory surface so that actions of the fingers (e.g., movement about the sensory surface) can be mapped to the display based at least in part upon the map(s) created at 106 in the example method 100. Moreover, in one embodiment, the input data may further comprise information on an amount of pressure respectively applied to the sensory surface by the one or more fingers. As will be described in more detail below, in one embodiment, such pressure information may be used to determine whether to hover over and/or engage an object of a user interface that is being displayed, for example.

At 110 in the example method 100, the input data is processed based at least in part upon a selected interaction model. The interaction models provide guidance and/or instruction on how to handle the input data and/or how to translate the input data into information that is more useful for the computer system. For example, as described above, the interaction model may provide for mapping the position and/or movement of a contact(s) (e.g., an event) that are applied relative to the sensory surface of the indirect interaction device. Thus, if one or more contacts are moved to the right on the sensory surface, a target or targets (e.g., mouse pointer(s)) respectively corresponding the contacts, may be moved to the right on the user interface of the display.

As will be described in more detail below with respect to FIGS. 2-4, the input data may be used to determine whether the computer system (e.g., or a portion thereof) is to enter a hover mode and/or an engage mode according to specifications of the interaction model. That is, the interaction models may be configured to specify whether a target is to merely hover over an element(s) of a user interface of the computer system and/or is to engage an element(s) of the user interface. Thus, the selection interaction mode may be configured to specify which actions of a contact(s) are configured to cause the computer system and/or a portion thereof (e.g., such as a pointer that is presented on the display) to enter a hover mode and/or which actions are configured to cause the computer system and/or a portion thereof to enter into an engage mode (e.g., to engage an object of the user interface).

At 112 in the example method 100, a target(s) is positioned and/or moved on a display of the computer system as provided for based upon the processed input data. Moreover, where the processed input data indicates that the computer system and/or portion thereof is to enter an engage mode, the target that is displayed on the computer system may be configured to engage an object of a user interface presented on the display. Such engagement may include, but it not limited to manipulating a scale of an object presented on the display, panning an object, dragging an object, rotating an object, and/or selecting an object (e.g., "click" a button), for example.

It will be appreciated that more than one target may be presented on the display of the computer system at 112 in the example method 100. As an example, a target may be presented for respective contacts detected by the sensory surface of the indirect interaction device. Thus, if two or more fingers, for example, are applied relative to the sensory surface (e.g., such that two or more fingers are detected by the sensory surface), two or more targets may be presented on the display. Targets may be controlled by respective contacts, such that a first contact controls the position/movement of the first target (e.g., and/or causes the first target to switch between a hover mode and/or an engage mode), a second contact controls the position/movement of the second target (e.g., and/or causes the second target to switch between a hover mode and/or an engage mode), etc. Thus, there may be a one-to-one ratio between the number of contacts detected and the number of targets presented, although other ratios are also contemplated. For example, in another one target may be presented for every two contacts (e.g., fingers, styli, etc.) that are detected.

It will also be appreciated that in some embodiments, the number of targets presented on the display may change as the number of contacts that are detected change. As an example, in one embodiment (e.g., when an indirect interaction device is mapped absolutely), zero targets may be displayed when no contacts are detected, one target may be displayed when one contact is detected, two targets may be displayed when two contacts are detected, etc. In another embodiment (e.g., when the indirect interaction device is mapped relatively), one or more contacts may be displayed even when no contacts are detected. For example, one target may be displayed when zero or one contact is detected, two targets may be displayed when two contacts are detected, etc.

Thus, in one embodiment, the computer system may be configured to present a target on the display for respective contacts detected by the indirect interaction device. Moreover, the position/movement of the targets may be controlled by a respective contact. That is, a first contact may control the position/movement of a first target, a second contact may control the position/movement of a second target, etc. In one embodiment, respective targets may be positioned/moved independent of the other targets. For example, if a user were to move a first finger on a touchpad while keeping another finger stationary, a target corresponding to the first finger may move while a target corresponding to the second finger remains stationary. Similarly, if a user picks up and/or otherwise ceases to "contact" the sensory surface with the second finger the second target may disappear and/or be presented in a different manner on the display.

It will be appreciated that by displaying a target for respective contacts that are detected by the sensory surface of the indirect interaction device, movements of the user may be visualized in a manner similar to the visualization that occurs on a direct interaction device, for example. That is, respective targets may respond in a manner similar to fingers touching a touchscreen, for example. Just as a user could place two fingers on a direct interaction device (e.g., interacting with and/or covering up multiple objects on the user interface), the user may visualize his/her fingers on the display (e.g., where his/her fingers are represented by the targets) even though the user is not in physical contact with the display (e.g., but is rather controlling the targets via an indirect interaction device), for example.

The example method 100 ends at 114.

Figure 2:
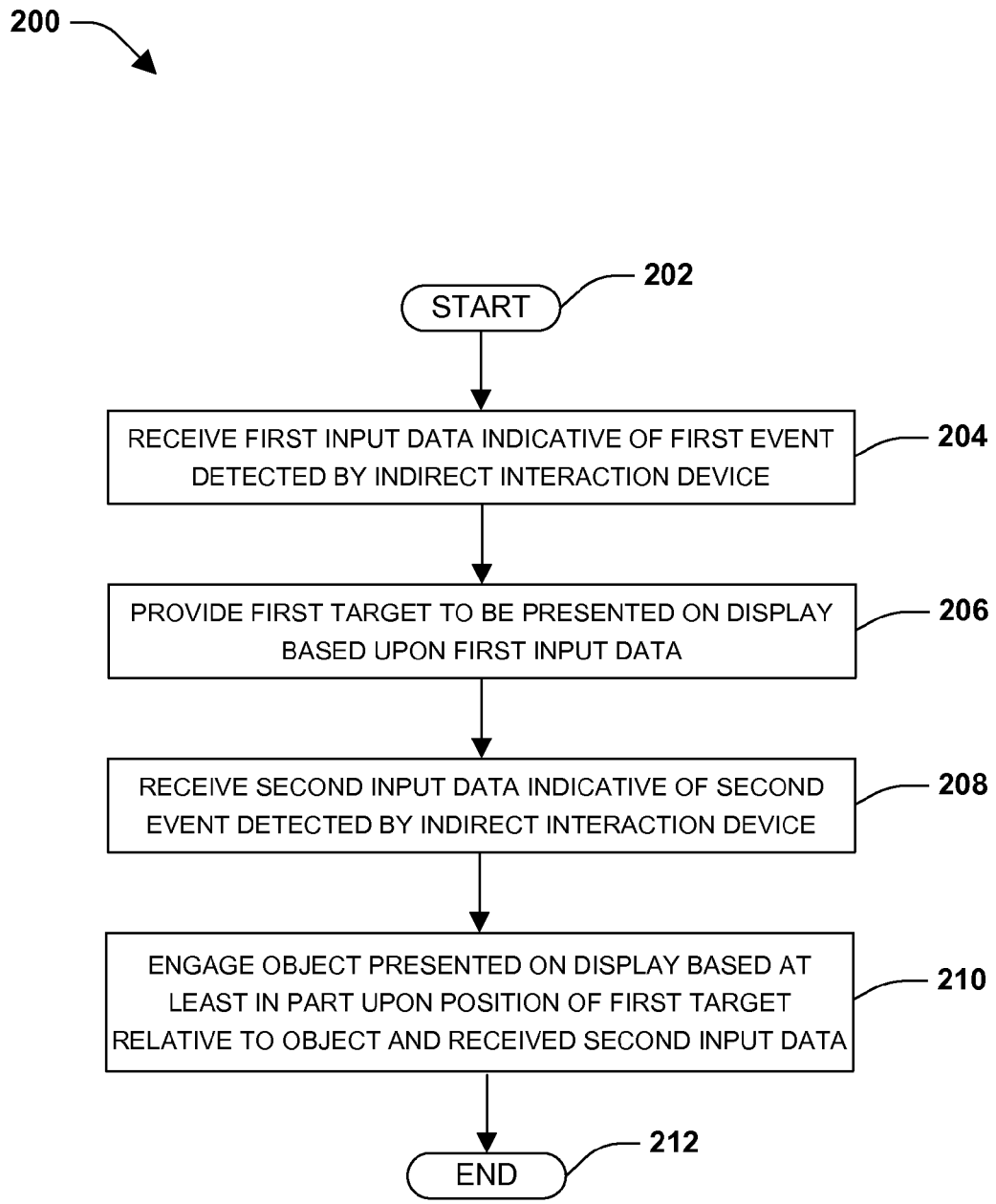
FIG. 2 is an exemplary indirect interaction method.

FIG. 2 illustrates an example indirect interaction method 200 for using an indirect interaction device to interact with a computer system, for example. More particularly, the example method 200 is an example technique for processing input data based upon a selected interaction model (e.g., 110 in FIG. 1). As an example, the method 200 may be configured to provide hover visualizations and/or engage visualizations that resemble visualizations provided to a user when the user interacts with a direct interaction device (e.g., such as a touchscreen). It will be appreciated that FIG. 2 is merely intended to provide a simplified flow diagram of an indirect interaction method, and FIGS. 3-4 may provide more specific details related to actions that may occur when input data is received from the indirect interaction device, which may be based at least in part upon an interaction model that has been selected.

The example method 200 begins at 202, and first input data indicative of a first event detected by an indirect interaction device is received at 204. The event is generally performed by a contact(s), and may comprise, for example, touching a contact (e.g., finger, stylus, etc.) to a sensory surface of the indirect interaction device, moving the contact on the sensory surface, etc. As an example, the first event may comprise detecting a first finger on and/or adjacent to the sensory surface (e.g., touch sensitive surface, heat sensitive surface, etc.) of the indirect interaction device and/or detecting movement of the first finger on sensory surface. Such an event may then be recorded and/or translated into input data (e.g., by the indirect interaction device) that is configured to be received by the computer system.

At 206 in the example method 200 a first target is provided to be presented on a display of the computer system data based upon the first input. That is, stated differently, the first event is mapped to the display according to mapping technique (e.g., which may be specified in the selected interaction model). For example, the mapping technique may comprise an absolute mapping technique, a relative mapping technique, and/or a heterogeneous mapping technique. As an example, if the first event comprises sliding a finger that is contacting the sensory surface to the right, mapping the first event to the display may comprise moving a target (e.g., pointer) to the right.

Generally speaking, at 206, the target is presented as a hover visualization. That is, the target may maneuver about the display and hover over objects of the user interface without engaging the objects. For example, the target may maneuver over applications without selecting the applications, initializing the applications, and/or manipulating the applications (e.g., or rather representations of the applications presented on the display). In this way, the target behaves similar to a traditional pointer (e.g., where the pointer can hover over the user interface until a user taps or clicks a button on a mouse, for example).

At 208 in the example method 200, second input data indicative of a second event that is detected by the indirect interaction device is received at 208. The second event may comprise, among other things, detecting a change in an amount of pressure applied by the contact (e.g., relative to the pressure applied when the first event was detected), detecting a second contact on and/or near the sensory surface, and/or detecting the engagement of a button or other engagement mechanism (e.g., that is part of the indirect interaction device) (e.g., configured to cause a transition of the computer system from a hover mode to an engage mode).

At 210 in the example method 200, one or more objects presented on the display are engaged based at least in part upon a position of the first target relative to the object and the received second data. That is, upon receipt of the second input data, one or more targets may transition from a hovering visualization (e.g., where the one or more targets merely hover over an object) to an engage visualization (e.g., where the one or more targets engage the object that the respective targets were hovering over).

For example, suppose a picture is displayed within the user interface that is presented on a computer system, and a user desires to interact with the picture using an indirect interaction device (e.g., a touchpad). The user may begin by placing one finger on a sensory surface of the touchpad and moving the finger on the sensory surface. This event (e.g., the placement of the finger on the sensory surface and/or the movement of the finger) may cause first input data to be generated at 204 by the indirect interaction device, for example, and transmitted to the computer system. The computer system may in turn, analyze the first input data at 206 (e.g., mapping the event to the display) and provide information to the display that causes the target to be positioned and/or moved in a manner that substantially corresponds with the placement and/or movement of the finger. Once the target is located at a position that is desirable to the user (e.g., is hovering over an object (e.g., the picture) the user desires to engage), the user may apply more pressure to the sensory surface via the first finger, place a second finger on the sensory surface, and/or select an engage element (e.g., button on the indirect interaction device). In response to such an event, second input data may be generated by the indirect interaction device and/or transmitted to the computer system. Based upon second input data (e.g., indicative of a second event), and the position of the target at the time the second event occurs, an object (e.g., the picture) of the user interface that is proximate to the target (e.g., at least partially overlapped by the target) may be engaged (e.g., the picture may be "grabbed" so that it can be dragged and dropped, for example).

It may be appreciated that engage and/or the like is used herein in a broad sense to describe one or more actions/manipulations that may occur to an object. For example, the scale of an object may be manipulated, an object may be panned, an object may be dragged to a different location, an object may be rotated, and/or an object may be otherwise selected (e.g., causing an application associated with the object to be initialized, launched, etc. and/or the user interface to change based upon the engagement with the object (e.g., a menu associated with the object may open)), etc.

It will also be appreciated that particular action(s) that are configured to transition the computer system and/or a portion thereof (e.g., a particular target) from a hover visualization to an engage visualization may be provided for in the specified interaction model. For example, as will be described in more detail below, in one embodiment, the detection of a second contact may transition a target associated with the first contact from a hover visualization to an engage visualization. However, in another example the detection of a second contact may merely cause targets to be displayed, where respective targets are in a hover visualization (e.g., and thus the mere detection of a second contact does not automatically cause one or more targets to transition from a hover visualization to an engage visualization).

Moreover, it will be appreciated that there may be intervening events between the first and second events which do not cause an object to be engaged. For example, a third event may occur between the first and second events, such as a movement of a contact relative to the sensory surface, that causes the target to move but does not necessarily cause an object to be engaged (e.g., because the third event was not a type of event specified in the interaction model to cause a target to transition from a hover mode to an engagement mode).

Figure 3:
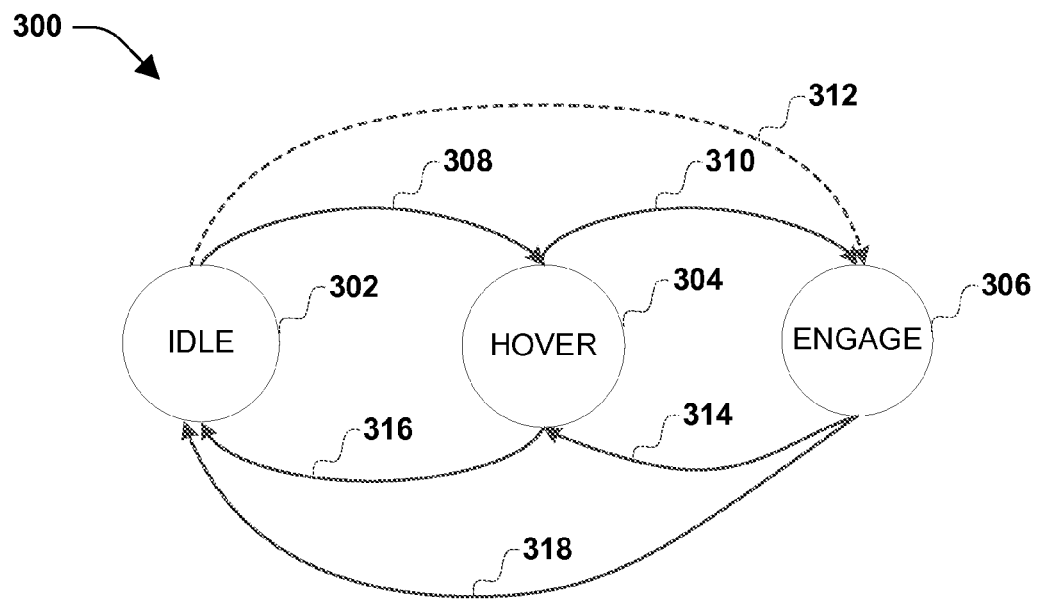
FIG. 3 is an exemplary interaction model for use with an indirect interaction device.

FIG. 3 illustrates an example interaction model 300 that may be used to transition between an idle 302, hover 304, and/or engage 306 mode. More specifically, FIG. 3 illustrates what may be referred to herein as a basic interaction model. Such an interaction model may provide for mapping events (e.g., the detection of contacts relative to a sensory surface of an indirect interaction model) absolutely, relatively, and/or heterogeneously.

Typically, the computer system and/or portion thereof is in idle mode 302 when a sensory surface of an indirect interaction device detects zero contacts (e.g., fingers) being applied relative to the sensory surface of the indirect interaction device. The number of targets that are displayed when the computer system and/or portion thereof is in idle mode may depend upon, among other things, the type of interaction model that is specified to be used by the computer system. For example, where the events are to be mapped relatively, at least one target may be presented on the display while the computer system (e.g., or a portion thereof) is in idle mode to provide some context (e.g., to a user) of where the target will move if the user interacts with the sensory surface to move the contact to the left and/or right of center, for example.

When events are mapped absolutely (e.g., when the sensory surface is mapped to the display absolutely) (e.g., such that a point on the sensory surface is mapped to a corresponding point on the display that is substantially fixed), zero or more targets may be presented on the display while the computer system and/or a portion thereof is in idle mode 302. That is, stated differently, a user may not need to be aware of the current placement of the target when the computer system is in idle mode 302 because the user may be aware of where the target will appear when a contact is applied relative the sensory surface without such a priori information (e.g., the target will appear in an area of the display that substantially corresponds to the area of the sensory surface that is touched).

When a first contact is applied relative to the sensory surface of the indirect interaction device (e.g., when a first finger touches a touchpad), the computer system and/or a portion thereof may transition from idle mode 302 to hover mode 304 as illustrated by the arrow 308 and/or a target may be displayed in a hover visualization. Hover mode 304 is configured to provide a user with a visualization of a target hovering over an object(s) of a user interface that is presented on the display. As an example, the user may maneuver the contact on the sensory surface to cause the target to move about the screen, causing it to appear as though the target is hovering over (e.g., but not engaging) objects. That is, stated differently, a target may overlap one or more objects of the presented user interface without engaging the objects. It will be appreciated that hover mode 304 may be similar to using a mouse, where the pointer is free to move about the user interface without engaging aspects of the user interface (e.g., unless a button is selected, at which time it is no longer hovering over objects). It may be appreciated, however, that merely hovering over an element may cause the element "react" (e.g., luminesce, change color, etc.) even though the element is not engaged.

When a second contact is applied relative to the sensory surface (e.g., when a second finger touches the touchpad) substantially currently with the first contact (e.g., such that two fingers are in contact with the touchpad), the computer system and/or a portion thereof may transition from hover mode 304 to engage mode 306 as illustrated by arrow 310 and/or the target may be displayed in an engage visualization. It will be appreciated that in one embodiment, the computer system (e.g., or a portion thereof) may be configured to display a target for respective contacts that are applied relative to the sensory surface. For example, where two contacts are applied relative to the sensory surface, two targets may be presented on the display; where three contacts are applied relative to the sensory surface, three targets may be presented on the display, etc.

Engage mode 306 is configured to cause the targets to engage objects that are proximate to the target(s) (e.g., to engage objects that are respectively at least partially overlapped by the targets). Engaging an object may involve, among other things, manipulating the scale of an object, panning an object, dragging an object, rotating an object, and/or otherwise selecting an object to cause some change in the object (e.g., initializing an application associated with the object and/or providing for the presentation of a menu associated with the object, etc.).

By way of example and not limitation, moving the two or more contacts towards one another on the sensory surface may cause the scale of the object relative to the size of the display to decrease. Similarly, moving the two or more contacts apart from one another on the sensory surface may cause the scale of the object relative to the size of the display to increase. Moving two or more contacts that are adjacent to one other may result in a pan manipulation if the object is a pannable object and/or may result in a drag manipulation if the object is draggable. Moving the two or more fingers in a rotating fashion may cause an object to be rotated in a manner similar to the rotation of the contacts. Thus, in a basic model 300, two or more contacts may be used to engage an object and/or provide for the manipulation of the object (e.g., if input data is indicative of two or more contacts being detected by the indirect interaction device, the target(s) are transitioned from a hover mode to an engage mode).

As illustrated by arrow 312 in the example model 300, it will be appreciated that in one embodiment, the computer system and/or a portion thereof may transition directly from idle mode 302 to engage mode 306 (e.g., bypassing hover mode 304). As an example, the input data may be indicative of the sensory surface transitioning from detecting zero contacts to detecting two or more contacts, thus causing the computer system to bypass hover mode 404.

Moreover, it will be appreciated that the computer system and/or portion thereof can be transitioned back to hover mode 304 if it is in engage mode 306 and/or back to idle mode 302 if it is in hover mode 304 and/or engage mode 306 (e.g., using a reverse technique). For example, when the sensory surface transitions from detecting two or more contacts to merely detecting one contact, the computer system and/or portion thereof may be transitioned from engage mode 306 to hover mode 304 as illustrated by arrow 314. Similarly, when the sensory surface transitions from detecting one contact to detecting zero contacts, the computer system and/or portion thereof may be transitioned from hover mode 304 to idle mode 302 as illustrated by arrow 316. If the sensory surface transitions from detecting two or more contracts to detecting zero contacts, the computer system and/or portion thereof may be transitioned from engage mode 306 to idle mode 302 (e.g., bypassing hover mode 304) as illustrated by arrow 318.

Figure 4:
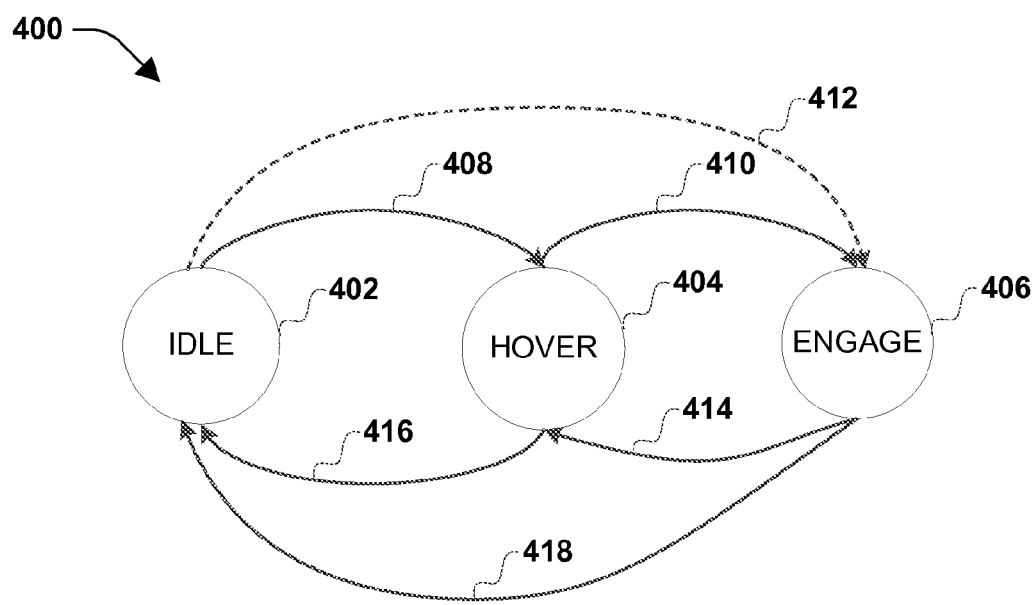
FIG. 4 is an exemplary interaction model for use with an indirect interaction device.

FIG. 4 illustrates another example interaction model 400 that may be used to transitioning between idle 402 (e.g., 302 in FIG. 3), hover 404 (e.g., 304 in FIG. 3), and/or engage 406 (e.g., 306 in FIG. 3) modes. More specifically, FIG. 4 illustrates what may be referred to herein as an advanced interaction model. Such an interaction model may provide for mapping events (e.g., the detection of contacts relative to a sensory surface of an indirect interaction model) absolutely, relatively, and/or heterogeneously.

Typically, the computer system and/or portion thereof is in idle mode 402 when a sensory surface of an indirect interaction device detects zero contacts (e.g., fingers) being applied relative to the sensory surface of the indirect interaction device. The number of targets that are displayed when the computer system and/or portion thereof is in idle mode may depend upon, among other things, the type of interaction model that is specified to be used by the computer system. For example, where the events are to be mapped relatively, at least one target may be presented on the display while the computer system (e.g., or a portion thereof) is in idle mode to provide some context (e.g., to a user) of where the target will move if the user interacts with the sensory surface to move the contact to the left and/or right of center, for example.

When events are mapped absolutely (e.g., when the sensory surface is mapped to the display absolutely) (e.g., such that a point on the sensory surface is mapped to a corresponding point on the display that is substantially fixed), zero or more targets may be presented on the display while the computer system and/or a portion thereof is in idle mode 402. That is, stated differently, a user may not need to be aware of the current placement of the target when the computer system is in idle mode 402 because the user may be aware of where the target will appear when a contact is applied relative the sensory surface without such a priori information (e.g., the target will appear in an area of the display that substantially corresponds to the area of the sensory surface that is touched).

When a first contact is applied relative to the sensory surface of the indirect interaction device (e.g., when a first finger touches a touchpad) an amount of pressure that is applied by the first contact may be determined. If the amount of pressure is within a specified range, the computer system (e.g., or a portion thereof) may transition from idle mode 402 to hover mode 404 as illustrated by the arrow 408 and/or a target may be displayed in a hover visualization. If the amount of pressure that is applied relative to the sensory surface is greater than and/or less than the specified range, the computer system (e.g., or a portion thereof) may transition from idle mode 402 to engage mode 406 (e.g., bypassing the hover mode 404) as illustrated by the arrow 412.

When there is a change in a manner through which the first contact is being applied relative to the sensory surface (e.g., when the pressure increases and/or decreases by a specified threshold), the computer system and/or a portion thereof) may transition from hover mode 404 to engage mode 406 as illustrated by arrow 410.

Engage mode 406 is configured to cause the targets to engage objects that are proximate to the target(s) (e.g., to engage objects that are respectively at least partially overlapped by the targets). Engaging an object may involve, among other things, manipulating the scale of an object, panning an object, dragging an object, rotating an object, and/or otherwise selecting an object to cause some change in the object (e.g., initializing an application associated with the object and/or providing for the presentation of a menu associated with the object).

It will be appreciated that while the basic model 300 illustrated in FIG. 3 generally utilized two contacts to enter engage mode 306 and/or manipulate an object, the advanced model 400 may utilized merely one contact (e.g., finger) to enter engage mode 406. By way of example and not limitation, moving a contact in one direction and/or pattern while in the engage mode may cause the scale of the object relative to the size of the display to decrease while moving the contact in an opposite direction and/or pattern may cause the scale of the object relative to the size of the display to increase. Similarly, moving the contact in yet another direction may result in a pan manipulation and/or a drag manipulation of the object. Rotating the contact on the sensory surface may cause the object to be rotated in a manner similar to the rotation of the contact. Thus, in an advanced model 400, merely one contact may be used to engage an object and/or provide for the manipulation of the object.

The computer system and/or portion thereof can be transitioned back to hover mode 404 if it is in engage mode 406 and/or back to idle mode 402 if it is in hover mode 404 and/or engage mode 406 (e.g., using a reverse technique). For example, when the pressure applied by the contact is brought back within the specified range, the computer system or portion thereof may be transitioned from engage mode 406 to hover mode 404 as illustrated by arrow 414. If the pressure applied drops below a specified threshold (e.g., drops to substantially zero) while the computer system and/or portion thereof is in hover mode 404, the computer system and/or portion thereof may transition to idle mode 402 as illustrated by arrow 416. Similarly, the computer system and/or a portion thereof can transition from engage mode 406 to idle mode 402 (e.g., bypassing hover mode 404) if the pressure drops below a specified threshold (e.g., drops to substantially zero) while the system is in engage mode 406 as illustrated by arrow 418.

It will be appreciated that while the basic model 300 described with respect to FIG. 3 and the advanced model 400 described with respect to FIG. 4 provide for making the transition between modes based upon particular events (e.g., the detection of multiple contacts and/or a change in pressure applied by a contact), other techniques for determining when to transition between various modes are also contemplated.

For example, in one embodiment, the transition between modes in the basic model and/or advanced model can be initiated based upon input data indicating that an engage button and/or switch, for example, has been activated (e.g., on the indirect interaction device). Thus, for example, a transition from hover mode to engage mode may occur when the received input data is indicative of a single contact being detected on the sensory surface and is indicative of an engage button being selected (e.g., depressed) on the indirect interaction device.

Moreover, it will be appreciated that while the basic model 300 referenced merely two contacts, more than two contacts may be applied relative to the sensory surface of the indirect interaction device. Similarly, more than one contact may be applied relative to the sensory surface of the indirect interaction device when the advanced model 400 is specified (e.g., by a computer manufacturer, user, etc.). As an example, in an advanced model, respective contacts can independently transitioned from hover mode to engage mode (e.g., and therefore can independently engage the same and/or different objects within the presented user interface). For example, when an increased pressure is applied by a first contact, a first target corresponding to the first contact may be transitioned from hover mode to engage mode while a second target corresponding to a second contact that does not increase the pressure applied relative to the sensory surface may remain in a hover mode (e.g., and may continue to hover over objects while the first target engages an object). In another example, the multiple targets are concurrently transitioned between modes. For example, when an engage button is selected, a plurality of targets (e.g., corresponding to a respective contact that is applied relative to the sensory surface) may transition from hover mode to engage mode (e.g., causing objects proximate respective targets to be engaged). For example, multiple applications can be launched, multiple images may "grabbed", etc.

Figure 5:
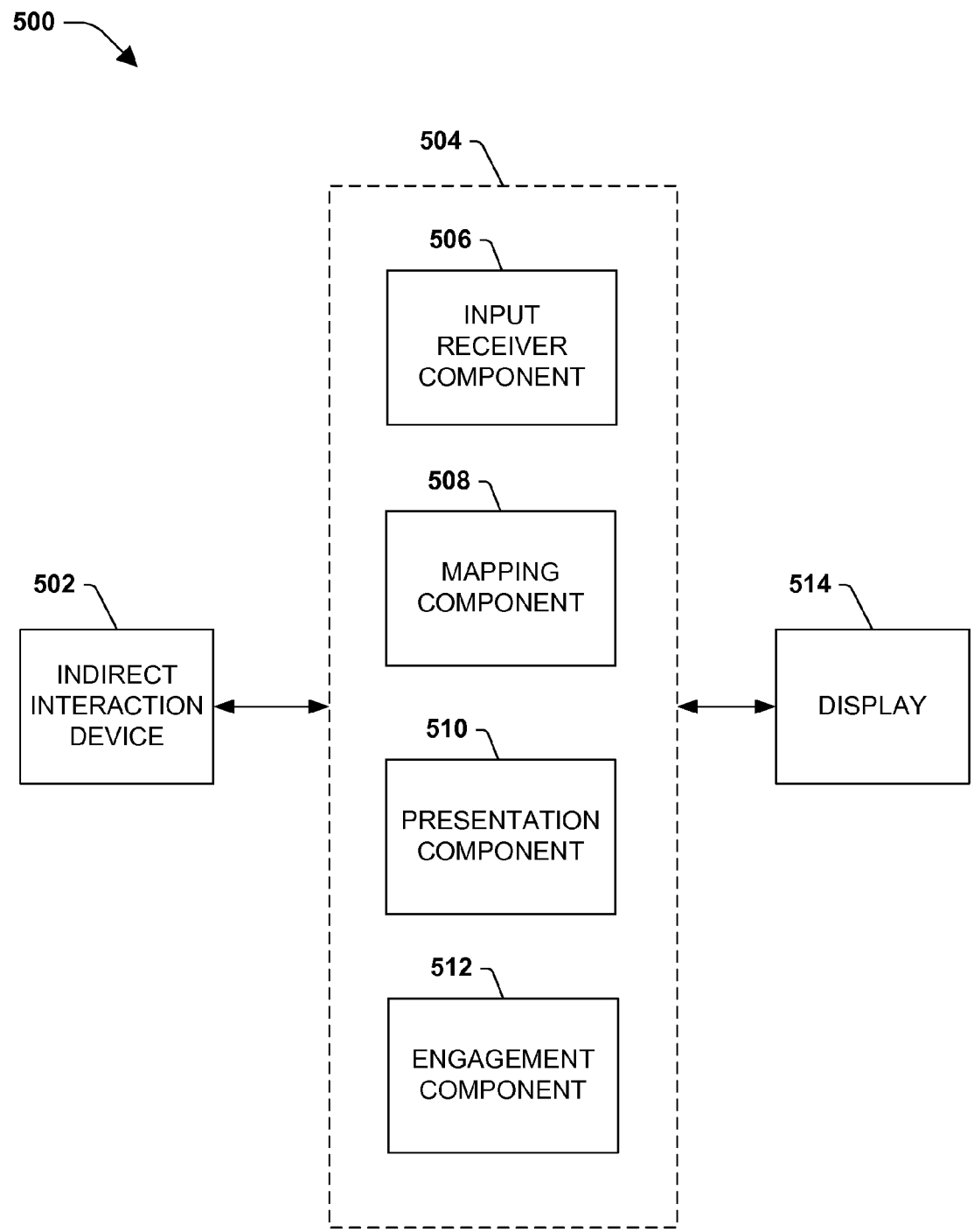
FIG. 5 is an exemplary system for controlling one or more targets presented on a display based upon input data received from an indirect interaction device.

FIG. 5 illustrates a component block diagram of an example environment 500 for an indirect interaction system 504. More specifically, FIG. 5 illustrates an example environment 500 of a system 504 configured to provide for interacting with objects presented on a display 514 based at least in part upon input data received from an indirect interaction device 502 (e.g., touchpad, touch sensitive mouse, etc.). Such a system may find particular applicability with respect to personal computers and/or other computing environments were precision movement within a user interface is desirable, although other applications are contemplated as well.

The example system 504 comprises an input receiver component 506 that may be configured to receive input from the indirect interaction device 502. As an example, the indirect interaction device 502 (e.g., which may comprise a touch sensitive surface, such as a touchpad, a heat sensitive surface, etc.) may be configured to detect particular types of events and/or translate those events into input data. It may be appreciated that event and/or the like is used herein in a broad sense to describe, among other things, the detection of one or more contacts, movement of contacts, changes in the contacts (e.g., such as pressure changes of respective contacts), etc. For example, the indirect interaction device 502 may be configured to detect one or more contacts that are applied relative to a sensory surface and to generate input data based upon the detection of the one or more contacts. Such input data may provide information regarding (e.g., indicative of), among other things, a location of the contact(s) applied relative to the sensory surface, an amount of pressure applied by respective contacts, etc. Where the contacts are moved relative to the sensory surface, the input data may also indicate such movement, for example.

The example system 504 also comprises a mapping component 508 that is configured to map events that are provided for in the input data to the display 514 using one or more mapping techniques (e.g., absolute mapping techniques, relative mapping techniques, and/or heterogeneous mapping techniques (e.g., as described above)). It will be appreciated that the particular mapping technique that is utilized may be provided for in user specified, manufacture specified, etc. interaction models. For example, in one embodiment, an operating system manufacture may specify that the system 504 is to map events that occur on the indirect interaction device 502 to the display 514 absolutely (e.g., the manufacture selects to user a basic, absolute interaction model and/or an advanced, absolute interaction model). In another embodiment, a user of the system 504 may specify an interaction model (e.g., thus specifying whether events are to be mapped relatively, absolutely, and/or heterogeneously).

The example system 504 also comprises a presentation component 510 configured to provide one or more targets for presentation on the display 514 based at least upon the input data received by the input receiver component 506 and the selected interaction model. More particularly, the presentation component is configured to insert one or more targets into a user interface that is presented on the display 514. The position of the one or more targets and/or movement of the one or more targets relative to the boundaries of the display 514, for example, may be determined by the mapping component 508 based upon the received input data.

The presentation component 510 may also be configured to transition the computer system and/or a portion thereof (e.g., respective targets) between an idle mode (e.g., 302 in FIG. 3), hover mode (e.g., 304 in FIG. 3), and/or engage mode (e.g., 306 in FIG. 3), for example, based at least in part upon the received input data and/or the specific interaction model.

By way of example, a basic interaction model (e.g., 300 in FIG. 3), specifying particular events that may cause the computer system and/or portion thereof to transition between modes, may be utilized by the presentation component 510 to determine when to transition between modes. As an example, the basic interaction model may provide that when the input data received by the input receiver component 506 is indicative of at least two contacts being applied relative to a sensory surface of the indirect interaction device 502, the presentation component 510 is to transition the target(s) from a hover visualization (e.g., where the targets are configured to hover over objects of the user interface) to an engage visualization (e.g., where the targets are configured to engage objects of the user interface). As another example, the basic interaction model may provide that when the input data received by the input receiver component 506 is indicative of at least one contact being applied relative to the sensory surface of the indirect interaction device 502 and indicative of an intention to engage (e.g., depression of an engage button), the presentation component 510 is to transition the target(s) from a hover visualization to an engage visualization. Thus, when the input data is indicative of two contacts being applied and/or indicative of one contact being applied and indicative of an intention to engage, the presentation component 510 may be configured to transition the target from a hover visualization to an engage visualization (e.g., or from an idle mode to an engage mode if the target was not previously in a hover mode). Similarly, when the input data is indicative of merely one contact and/or is not indicative of an intention to engage, the presentation component 510 may be configured, for example, to transition the target from engage visualization to a hover visualization (e.g., or from an idle mode to a hover mode if the target was previously in an idle mode).

As another example, an advanced interaction model (e.g., 400 in FIG. 4), specifying particular events that may cause the computer system and/or portion thereof to transition between modes, may be utilized by the presentation component 510 to determine when to transition between modes. As an example, the advanced interaction model may provide that when the input data received by the input receiver component 506 is indicative an increase in the pressure applied by a contact, the presentation component 510 is to transition the target associated with the contact from a hover visualization to an engage visualization. As another example, the advanced interaction model may provide that when the input data received by the input receiver component 506 is indicative of at least one contact being applied relative to the sensory surface of the indirect interaction device 502 and indicative of an intention to engage (e.g., depression of an engage button), the presentation component 510 is to transition the target(s) from a hover visualization to an engage visualization. Thus, when the input data is indicative of a change in pressure applied to the sensory surface by one or more contacts and/or indicative of one contact being applied and indicative of an intention to engage, the presentation component 510 may be configured to transition the target from a hover visualization to an engage visualization (e.g., or from an idle mode to an engage mode if the target was not previously in a hover mode). Similarly, when the input data is indicative of a contact that is applying less than a specified amount of pressure and/or is not indicative of an intention to engage, the presentation component 510 may be configured, for example, to transition the target from engage visualization to a hover visualization (e.g., or from an idle mode to a hover mode if the target was previously in an idle mode).

It will be appreciated that in one embodiment, the presentation component 510 may also be configured to provide for the presentation of at least two targets on the display 514 when the input data received by the input receiver component 506 is indicative of two or more contacts being applied relative to a sensory surface of the indirect interaction device 502 (e.g., indicative of two or more contacts being detected by the sensory surface). As an example, if the input data is indicative of two contacts being applied, the presentation component 510 may be configured to provide for the presentation of two targets on the display 514; if the input data is indicative of three contacts being applied, the presentation component 510 may be configured to provide for the presentation of three targets on the display; etc. It will be appreciated that in another embodiment, the presentation component 510 may be configured to provide for some different ratio of targets to contacts detected other than the one-to-one ratio described above. For example, in another embodiment, the presentation component 510 may be configured to provide for the presentation of one target per two contacts detected by the sensory surface of the indirect interaction device 502, etc.

Where the presentation component 510 provides for the presentation of a plurality of targets, it will be appreciated that the targets may function independently of one another. For example, where the targets correspond to a respective contact, movement of a first contact on the sensory surface may cause movement of a first, corresponding target on the display while targets associated with other, non-moving contacts remain stationary. Moreover, in one embodiment, the presentation component 510 may be configured to transition respective targets between hover and engage modes independently. For example, in one embodiment (e.g., such as where the presentation component 510 utilizes an advanced interaction model), respective targets can transition between hover and engage modes based upon the pressure applied to the sensory surface by respective contacts. For example, a first contact, corresponding to a first target, may apply a pressure that exceeds a specified threshold, causing the first target to enter an engage mode. Concurrently, a second contact, corresponding to a second target, may apply a pressure that is less than a specified threshold, causing the second target to enter/remain in a hover mode.

The example system 500 also comprises an engagement component 512 configured to provide for the engagement of an object in a user interface presented on the display 514 based upon the target entering engage mode (e.g., based upon an event(s) specified in the interaction model that is being used). As an example, the engagement component may be configured to manipulate that size of an object the target is engaging (e.g., by at least partially overlapping the object), pan the object, drag the object, rotate the object, and/or otherwise manipulate the object.

Figure 6:
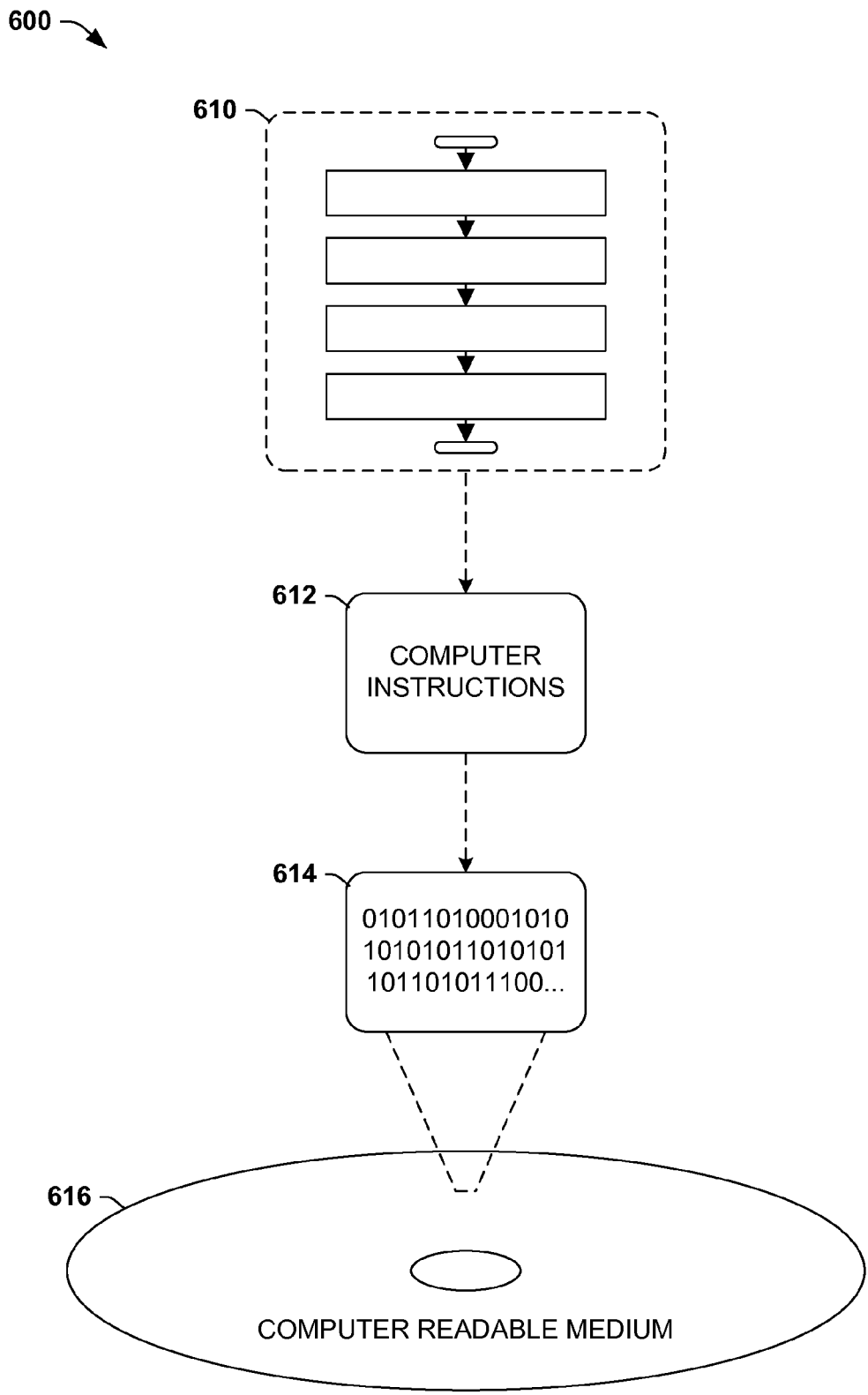
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or the exemplary method 200 of FIG. 2, for example. In another such embodiment, the processor-executable instructions 612 may be configured to implement a system, such as at least some of the exemplary system 500 of FIG. 5, for example. Many such computer-readable media 616 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
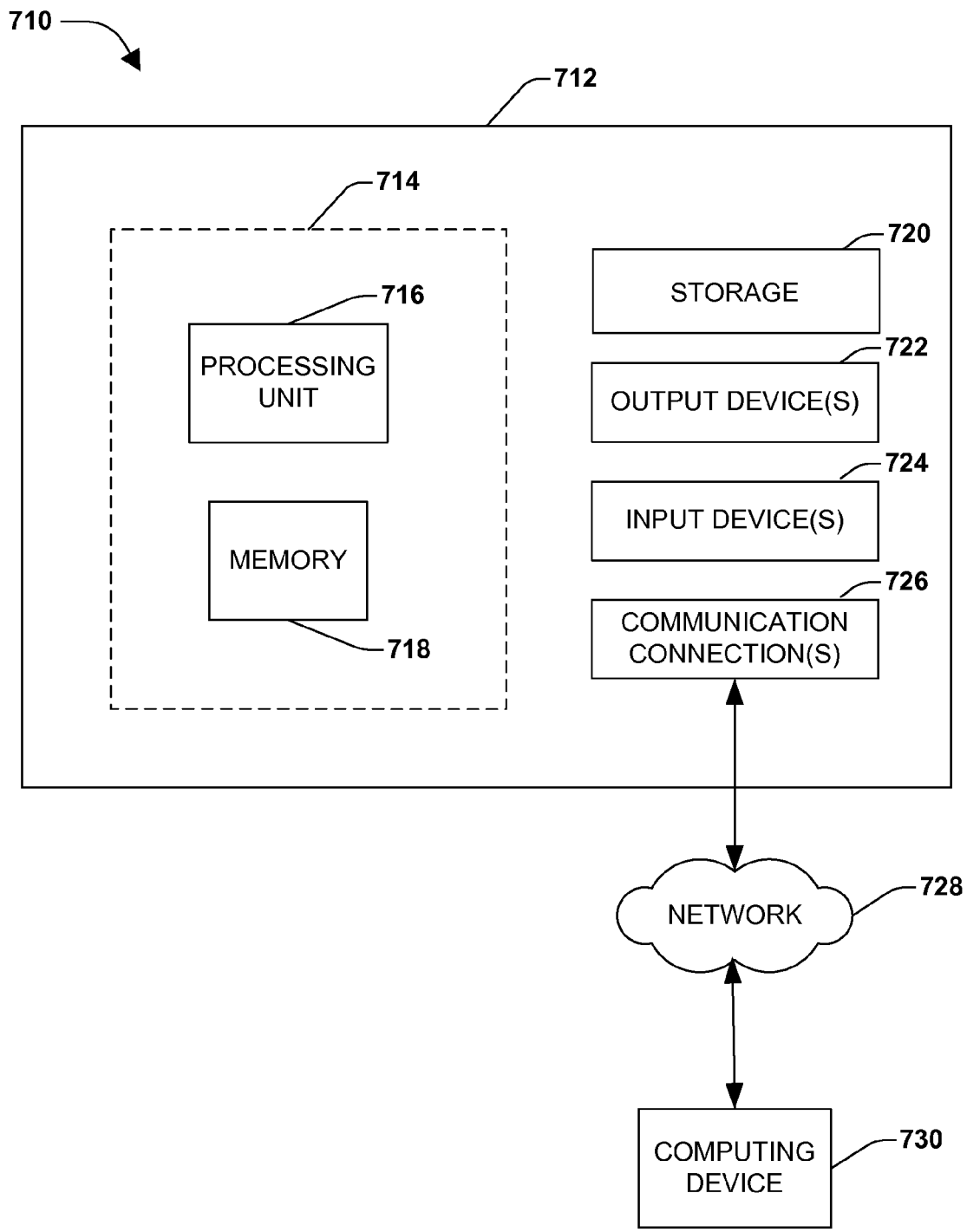
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example), or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs.

Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An indirect interaction system, comprising:
    an input receiver configured to receive input data indicative of an event detected by the sensory surface of an indirect interaction device, the input data indicative of at least a first and second contact being applied relative to the sensory surface, the input data including a location of each of the at least a first and second contact relative to the sensory surface; and,
    a presentation component configured to provide at least a first and second target for presentation on a display based at least in part upon the input data, the first target indicative of the first contact applied to the sensory surface and the second target indicative of the second contact applied to the sensory surface, the first target and the second target provided for presentation on the display based at least in part on the location of the first and second contact, respectively, relative to the sensory surface.

2. The system of claim 1, further comprising a mapping component configured to provide a mapping of touch sensors on the sensory surface of the indirect interaction device to a display wherein the first target and the second target are provided for presentation on the display based at least in part on the mapping provided by the mapping component.

3. The system of claim 2, wherein the mapping component is configured to map the touch sensors on the sensory surface of the indirect interaction device to the display based at least in part upon an absolute display mapping technique.

4. The system of claim 2, wherein the mapping component is configured to map the touch sensors on the sensory surface of the indirect interaction device to the display based at least in part upon a relative display mapping technique.

5. The system of claim 2, wherein the mapping component is configured to map the touch sensors on the sensory surface of the indirect interaction device to the display based at least in part upon a heterogeneous mapping technique.

6. The system of claim 1, wherein the sensory surface and the display are separate physical components of the system.

7. The system of claim 1, the presentation component configured to provide for at least one of:
    movement of the first target on the display independently of movement of the second target on the display; and
    movement of the first target on the display dependently of movement of the second target on the display.

8. The system of claim 1, wherein the event comprises a first event and the system further comprises an execution component configured to provide for an engagement of an object in a user interface presented on the display based at least in part upon a received second event detected by the sensory surface.

9. An indirect interaction method, comprising:
    receiving first input data indicative of a first event detected by a sensory surface of an indirect interaction device the first input data indicative of at least a first and second contact being applied relative to the sensory surface, the input data including a location of each of the at least a first and second contact relative to the sensory surface;
    providing at least a first and second target to be presented on a the display based at least in part upon the first input data, the first target indicative of the first contact applied to the sensory surface and the second target indicative of the second contact applied to the sensory surface, the first target and the second target provided for presentation on the display based at least in part on the location of the first and second contact, respectively, relative to the sensory surface;
    receiving second input data indicative of a second event detected by the sensory surface; and
    engaging an object presented on the display based at least in part upon a position of the first target relative to the object and the received second input data.

10. The method of claim 9, comprising presenting a hover visualization of the first target based at least in part upon the first input data.

11. The method of claim 9, further comprising mapping touch sensors on the sensory surface of the indirect interaction device to the display, and wherein the providing the first and the second target to be presented on the display is based at least in part upon the mapping.

12. The method of claim 11, wherein the mapping comprises using at least one of an absolute mapping technique and a relative mapping technique.

13. The method of claim 9, the first event indicative of as first contact being applied relative to the sensory surface and the second event indicative of a second contact being applied relative to the sensory surface, the first and second events occurring substantially concurrently.

14. The method of claim 9, wherein the method further comprises mapping touch sensors on the sensory surface of the indirect interaction device to the display using an absolute mapping technique.

15. The method of claim 9, wherein the method further comprises mapping touch sensors on the sensory surface of the indirect interaction device to the display using a relative mapping technique.

16. The method of claim 9, the first event indicative of a first contact being applied relative to the sensory surface and the second event indicative of a change in a manner through which the first contact is being applied relative to the sensory surface.

17. The method of claim 16, the change indicative of a change in pressure applied to the sensory surface.

18. The method of claim 16, wherein the method further comprises mapping touch sensors on the sensory surface of the indirect interaction device to the display using an absolute mapping technique.

19. The method of claim 16, wherein the method further comprises mapping the first event to the display using a relative mapping technique.

20. A device comprising: at least one processing unit and memory including instructions that when executed cause the at least one processing unit to:

receive first input data indicative of an event detected by a sensory surface of an the indirect interaction device the first input data indicative of a first and second contact being applied relative to the sensory surface, the input data including a location of each of the first and second contact relative to the sensory surface;

provide a first and second target to be presented on a display based at least in part upon the first input data, the first target indicative of the first contact applied to the sensory surface and the second target indicative of the second contact applied to the sensory surface, the first target and the second target provided for presentation on the display based at least in part on the location of the first and second contact, respectively, relative to the sensory surface;

receive second input data indicative of a second event detected by the sensory surface, where at least one of:

the first event is indicative of the first and second contact being applied relative to the sensory surface and the second event is indicative of the first and second contact being moved relative to the sensory surface, and the first event is indicative of the first and second contact being applied relative to the sensory surface and the second event is indicative of a change in a manner through which the first contact is being applied relative to the sensory surface; and engage an object presented on the display based at least in part upon the location of the first target relative to the object and the second input data.

\* \* \* \* \*